United States Patent
Takahashi

(10) Patent No.: US 7,348,757 B2
(45) Date of Patent: Mar. 25, 2008

(54) CIRCUIT TO IMPROVE MOTOR PHASE CURRENT RECONSTRUCTION VIA DC LINK

(75) Inventor: Toshio Takahashi, Rancho Palos Verdes, CA (US)

(73) Assignee: International Rectifier Corporation, El Segundo, CA (US)

( * ) Notice: Subject to any disclaimer, the term of this patent is extended or adjusted under 35 U.S.C. 154(b) by 196 days.

(21) Appl. No.: 11/324,699

(22) Filed: Jan. 3, 2006

(65) Prior Publication Data

US 2006/0245743 A1    Nov. 2, 2006

Related U.S. Application Data

(60) Provisional application No. 60/641,175, filed on Jan. 3, 2005.

(51) Int. Cl.
*H02P 23/00* (2006.01)

(52) U.S. Cl. .............. 318/811; 318/636; 318/801; 318/800; 388/825; 388/831; 388/901

(58) Field of Classification Search .......... 318/636, 318/801, 800; 388/825, 831, 901; 324/107
See application file for complete search history.

(56) References Cited

U.S. PATENT DOCUMENTS

2003/0173946 A1 * 9/2003 Liu et al. .................... 324/107

* cited by examiner

*Primary Examiner*—Karen Masih
(74) *Attorney, Agent, or Firm*—Ostrolenk, Faber, Gerb & Soffen, LLP

(57) ABSTRACT

Apparatus for reconstructing the phase currents of a multiphase load driven by a multiphase inverter fed by a DC link and controlled by a PWM controller, the apparatus including a sensor in the DC link, first and second sampling arrangements for sampling the current in the DC link by obtaining an output from said sensor, the first sampling arrangement obtaining a first sample of the current in the DC link during a first time period corresponding to a first switching pattern of said multiphase inverter and storing said first sample; the second sampling arrangement obtaining a second sample of the current in the DC link during a second time period after said first time period and corresponding to a second switching pattern of said multiphase inverter and storing said second sample; an A/D converter for converting said first sample to a digital signal during a time period after said first time period and for converting said second sample to a digital signal during a following third time period.

14 Claims, 6 Drawing Sheets

CIRCUIT TO IMPROVE MOTOR PHASE CURRENT RECONSTRUCTION VIA DC LINK

CROSS REFERENCE TO RELATED APPLICATION

This application claims the benefit and priority of U.S. Provisional patent application Ser. No. 60/641,175 filed Jan. 3, 2005 entitled CIRCUIT TO IMPROVE MOTOR PHASE CURRENT RECONSTRUCTION VIA DC LINKS, the entire disclosure of which is incorporated herein by reference.

BACKGROUND OF THE INVENTION

In the digital PWM AC inverter based motor drive system, good quality of the motor phase current feedback is required to perform the closed loop current control. In order to reduce the system cost and simplify the current sensing system, the multiple motor phase current information can be reconstructed via DC link current information. The traditional circuit to achieve the motor phase current reconstruction via the DC link uses a single sample and hold circuit combined with an A/D converter. However, this method imposes a significant limitation on reconstruction when the line-to-line active voltage becomes small due to the PWM logic when the time duration of a switching pattern generating the active voltage vector is small. A new method is described herein having two parallel sample and hold circuits instead of one sample and hold circuit to minimize the time duration limitation on the active voltage vector. With this new circuit, fidelity of motor current reconstruction is improved and it expands the use of DC link current reconstruction for a wide range of AC motor applications including permanent magnet motors and induction motors.

Traditional DC link current sensing and reconstruction of the phase current uses both hardware and a software algorithm in a digital motor control application. The hardware circuit normally consists of an amplifier, sample and hold circuit, multiplexer and A/D converter. The location of the sample and hold circuit may be different (see FIGS. 1 and 2), however it has only one sample and hold circuit as a common approach. In three phase AC motor applications, two phase current information is required to be reconstructed in order to provide three AC phase currents at a time. FIG. 3 shows a typical inverter circuit with AC motor with particular current flow which corresponds to the switching pattern (100) in a PWM cycle in FIG. 4. DC link current sensing, which can be realized by a single shunt resistor R (FIG. 3) or a hall effect type current sensor, normally contains two phase current information within a PWM cycle. FIG. 4 contains the phase U and phase W current information as an example. The duration period of each of the two phase current information on the DC link varies with synchronization of particular PWM switching pattern in a PWM cycle. In FIG. 4, the switching states of the inverter switches are shown, with "1" meaning a high side switch is on. Accordingly, active voltage vector state "100" is when high side switch $U_1$ (FIG. 3) is on ($U_2$ is off), $V_1$ off ($V_2$ on), and $W_1$ off ($W_2$ on). This is the state of FIG. 3. As shown in FIG. 4, during switching state or active voltage vector 100, the current in the DC link is the phase current IU, which is equal to $-(IV+IW)$.

With a conventional reconstruction circuit as shown in FIG. 1 or FIG. 2, the first phase current is captured by a sample and hold circuit S/H and subsequently converted to a digital quantity by an A/D converter. After this first phase current sampling and conversion, the second phase current is captured by the same sample and hold circuit S/H and converted by the A/D converter. Therefore, these two phase current analog-to-digital conversions take place sequentially as follows:

1) Capture the first motor phase current by sample and hold circuit
2) Convert the first motor phase current by A/D converter
3) Capture the second motor phase current by sample and hold circuit
4) Convert the second motor phase current by A/D converter.

In a typical three phase center aligned PWM modulation scheme, the above sequential event occurs twice in a PWM cycle as shown in FIG. 4. The order of each phase current follows: the first motor phase current (T1 period)→ the second motor phase current (T2 period)→ the second motor phase current (T2 period) → the first motor phase current (T1 period). The two events are separated by the zero voltage vector 111 when no current flows.

In this example, the first motor phase current represents the motor phase U current while the second motor phase current represents the motor phase W current in negative value. The phase V motor phase current is derived by the fact that the sum of all three phase motor currents equal to zero.

This conventional method of two phase motor current reconstruction has a limitation when the duration period of phase current (T1 and/or T2 in FIG. 4) becomes shorter than the time required for the sample and hold circuit and A/D converter to both capture the phase current analog value and complete A/D conversion. A typical time for the sample and hold circuit to capture the analog value is around a few hundreds of nanoseconds to one microsecond, while a typical time for A/D conversion ranges from a few microsecond to ten microseconds for a 12 bit A/D converter.

Therefore, practically three microseconds is a limitation below which current reconstruction cannot be achieved. The duration period (T1 and T2) is an exact time period of the active voltage vector. In the FIG. 3 example, they are the (100) and (110) vectors respectively for T1 and T2 periods.

As the voltage vector rotates in the space vector domain (FIG. 5), motor phase current reconstruction cannot be achieved when it reaches the so-called "sector crossing" regions shown as the hatched areas. In these regions, either T1 or T2 become very small and do not give enough time for both capturing and A/D conversion.

SUMMARY OF THE INVENTION

The present invention provides a solution to this problem, allowing for capture and A/D conversion for reduced duration pulse width as compared to the prior art.

According to the invention, apparatus is provided for reconstructing the phase currents of a multiphase load driven by a multiphase inverter fed by a DC link and controlled by a PWM controller, the apparatus comprising a sensor in the DC link; first and second sampling arrangements for sampling the current in the DC link by obtaining an output from said sensor, the first sampling arrangement obtaining a first sample of the current in the DC link during a first time period corresponding to a first switching pattern of said multiphase inverter and storing said first sample; the second sampling arrangement obtaining a second sample of the current in the DC link during a second time period after said first time period and corresponding to a second switching pattern of said multiphase inverter and storing said second sample; an A/D converter for converting said first sample to a digital signal during a time period after said first time period and for converting said second sample to a digital signal during a following third time period.

BRIEF DESCRIPTION OF THE DRAWING(S)

The invention will be described in greater detail in the following detailed description with reference to the drawings, in which FIG. 1 shows a prior art circuit for determining motor phase current from the DC link of the motor controller;

DETAILED DESCRIPTION OF PREFERRED EMBODIMENTS OF THE INVENTION

Figure 1:
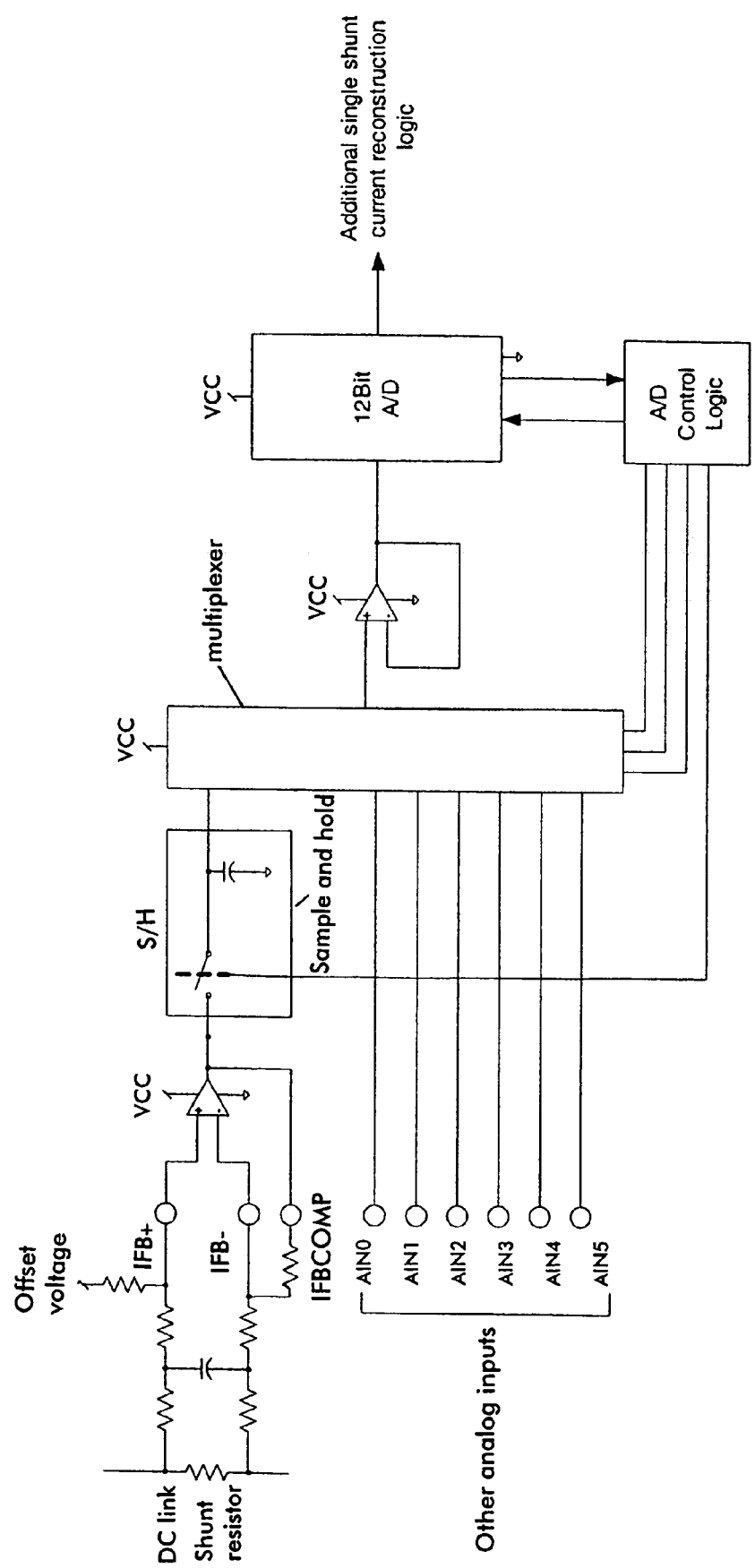
Figure 2:
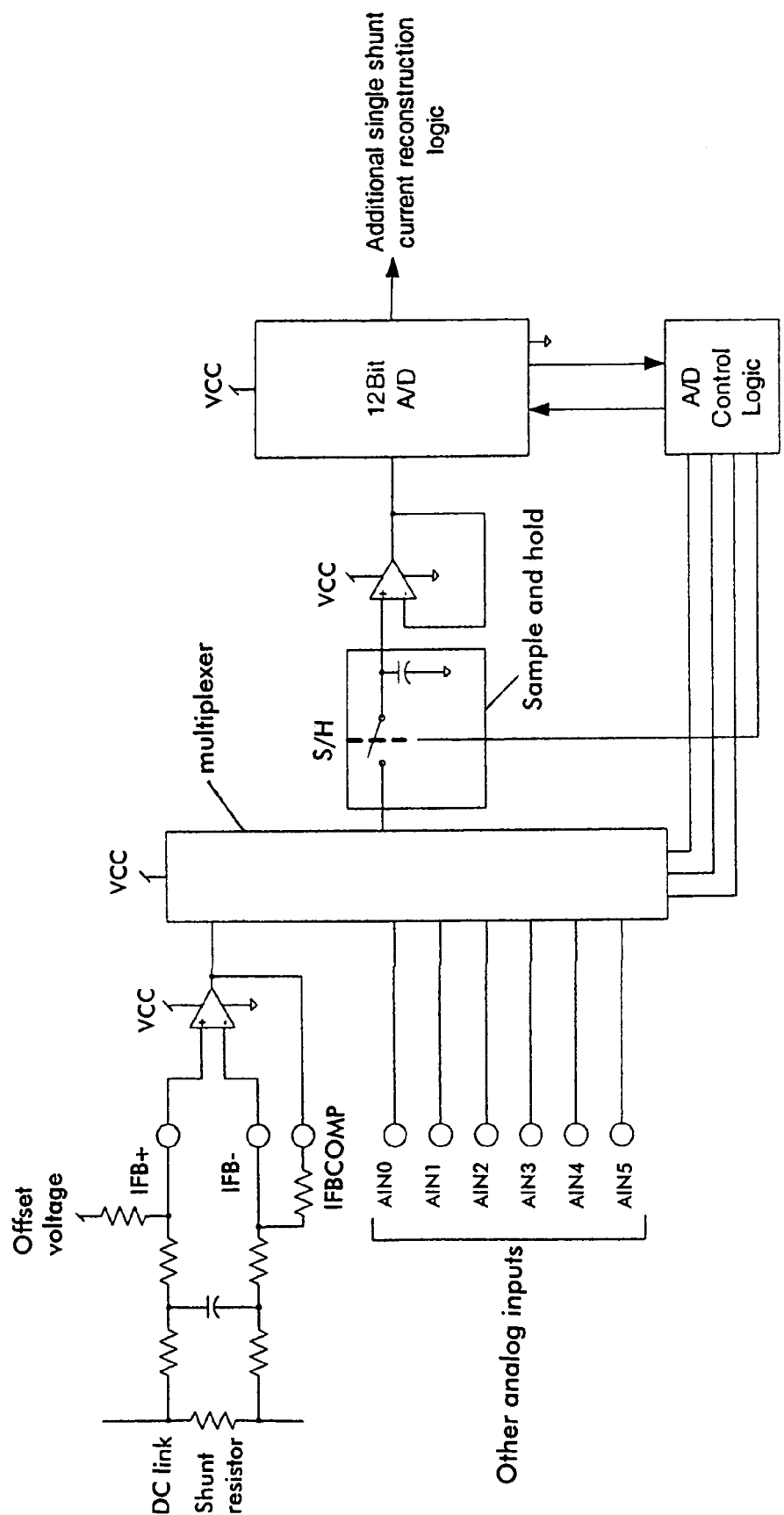
FIG. 2 shows another prior art circuit.
Figure 3:
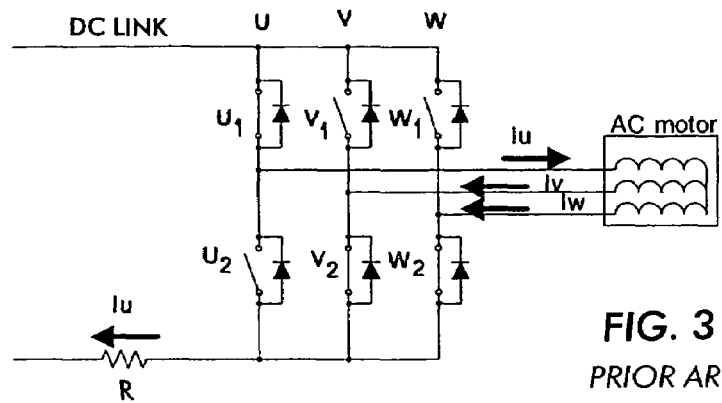
FIG. 3 shows the DC link and inverter of a motor controller.
Figure 4:
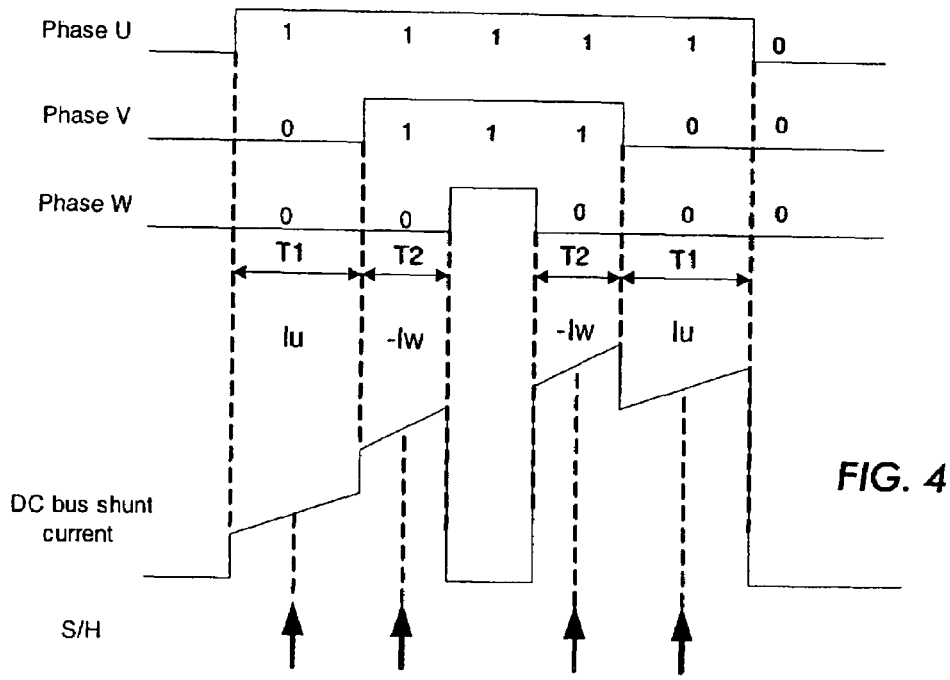
FIG. 4 shows a PWM cycle of the inverter showing switching patterns and thus how the active voltage vectors are generated.
Figure 5:
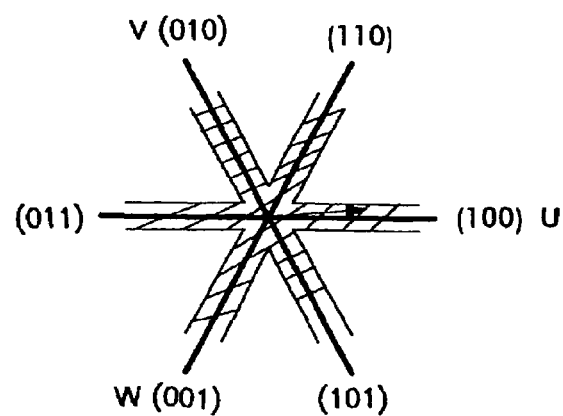
FIG. 5 shows the space vector diagram for the inverter.
Figure 6:
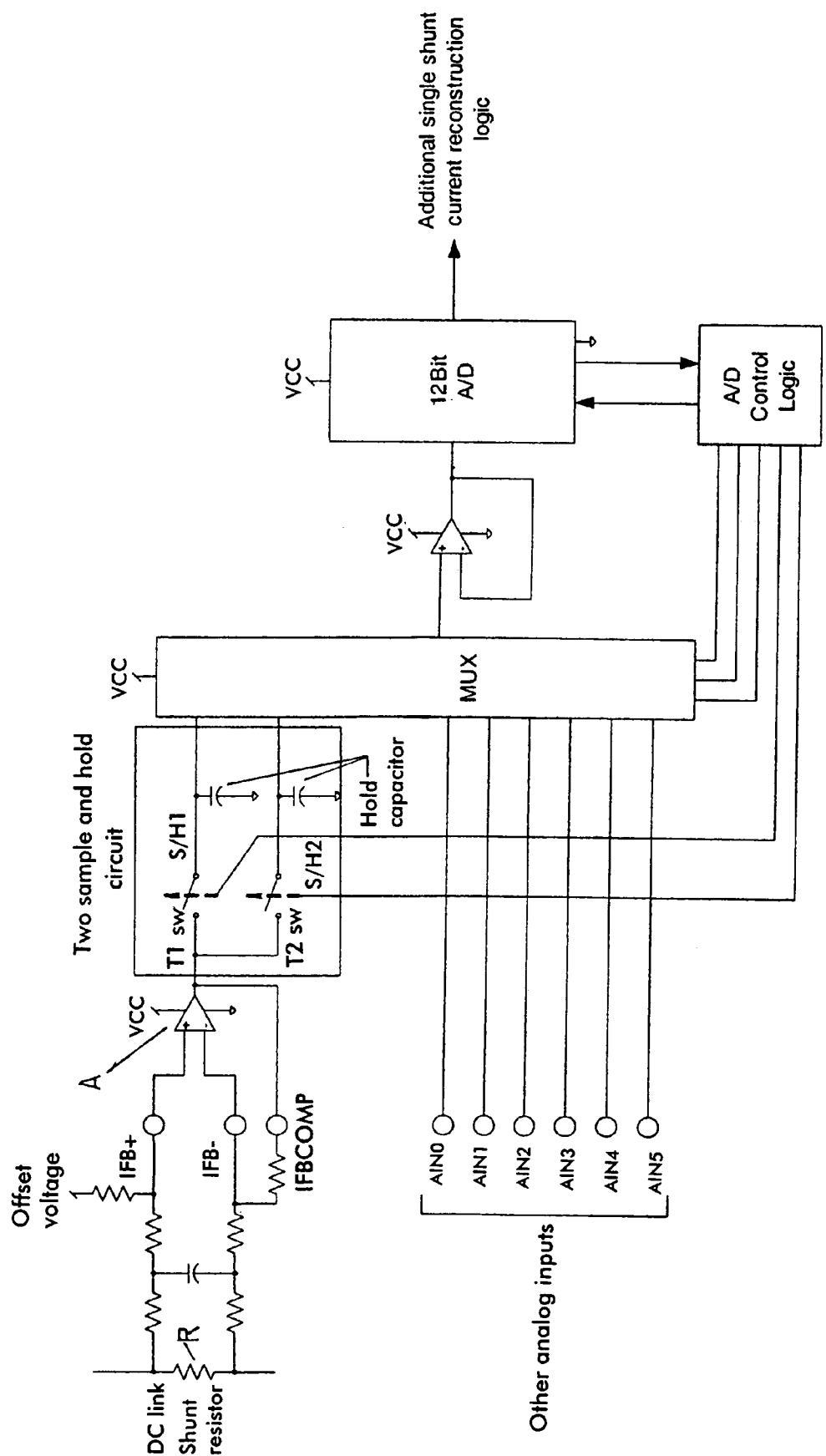
FIG. 6 shows one embodiment of a circuit according to the invention.

In order to minimize the limitation due to time duration of active vectors (T1 and T2), a new circuit was developed, an embodiment of which is shown in FIG. 6. It has two sample and hold circuits S/H1 and S/H2 in parallel to capture two motor current signals appearing on the DC link. In this circuit, even if the voltage vector stays in the "sector crossing" region, the associated motor phase current can be captured at a sampling time. A/D conversion can be processed not necessarily immediately after capturing the analog value of a phase current feedback, rather conversion occurs after the second phase current capturing is completed.

An advantage of this method is to minimize the time restriction on active voltage vectors (T1 and T2) by eliminating the time required for A/D conversion on the first motor phase current reconstruction.

The circuit includes an operational amplifier A and two parallel sample/hold circuits S/H1 and S/H2. The operational amplifier A is used to adjust the analog input voltage developed across the DC link shunt resistor R. The operational amplifier comprises a differential mode amplifier to eliminate common mode noise which may appear in the system. Two parallel sample/hold circuits S/H1 and S/H2 are designed to capture two motor phase chopped current information by synchronizing to the PWM switching pattern. Each sample and hold circuit typically consists of a switch and capacitor, as shown. The switch is typically realized by pass MOS transistor(s) in series and the hold capacitor is connected after the pass transistors switch and designed to hold the analog captured value without a droop of voltage drop. The sample/hold switches (T1 and T2 switches) are normally closed and opened at a center point of the respective active voltage vectors. While the T1 switch is open, the analog value stored in the capacitor remains unchanged and subsequent A/D conversion takes place in order to digitize the first motor phase current. In one embodiment, while A/D conversion of the first motor phase current is in process, switch T2 is independently able to capture the second motor phase current even if the T1 period becomes very small. Once the A/D conversion associated with the first motor phase current is completed, the second motor phase current A/D conversion starts based on the stored analog value on the hold capacitor for switch T2. In this way, the circuit can perform parallel action between capturing the second motor phase current and performing A/D conversion of the first motor phase current.

In this new method, the time constraint on the T1 and/or T2 period is restricted only by the capture time of the sample and hold circuit which is typically less than five hundred nanoseconds depending on the hold capacitor size. Therefore when comparing the traditional method mentioned above, this new method significantly reduces the sector crossing region in the space vector domain in which the phase currents are not determinable which in turns improves the fidelity of the reconstructed current waveform and reduces distortion.

Figure 7:
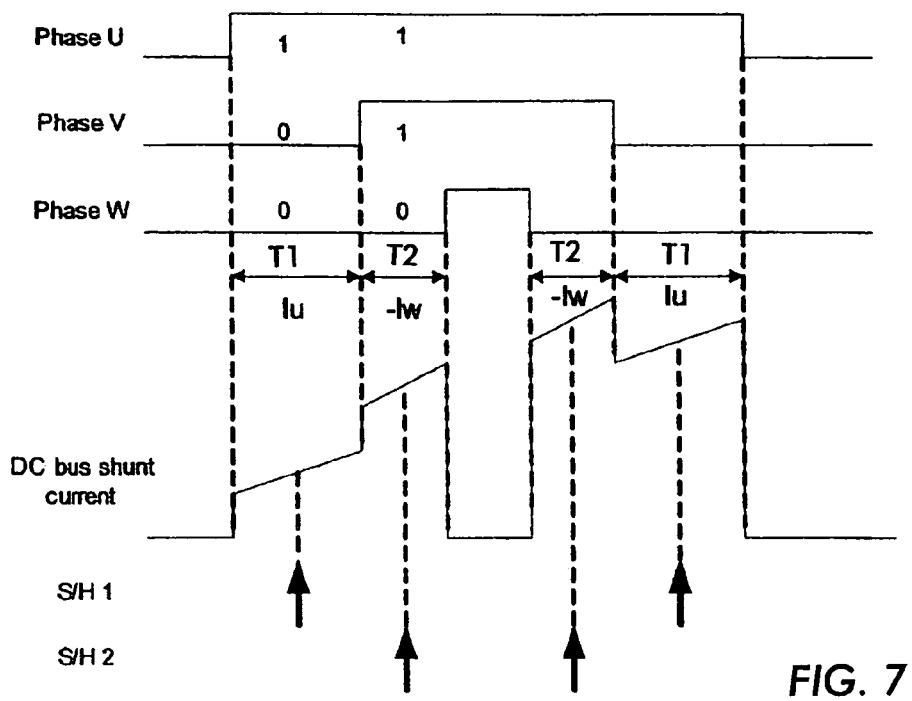
FIG. 7 shows switching patterns and sample times for the circuit of FIG. 6 for three phase modulation.

FIG. 7 shows a typical switching pattern in 3-phase PWM modulation with two separate sample and hold actions. In this example, even if the T1 period becomes very small, its information is captured by the hold capacitor of switch T1 at a center of the T1 period. Duration time of A/D conversion of T1 period (S/H1) can be overlapped with capturing of T2 period by the dedicated sampling and hold (S/H2).

Figure 8:
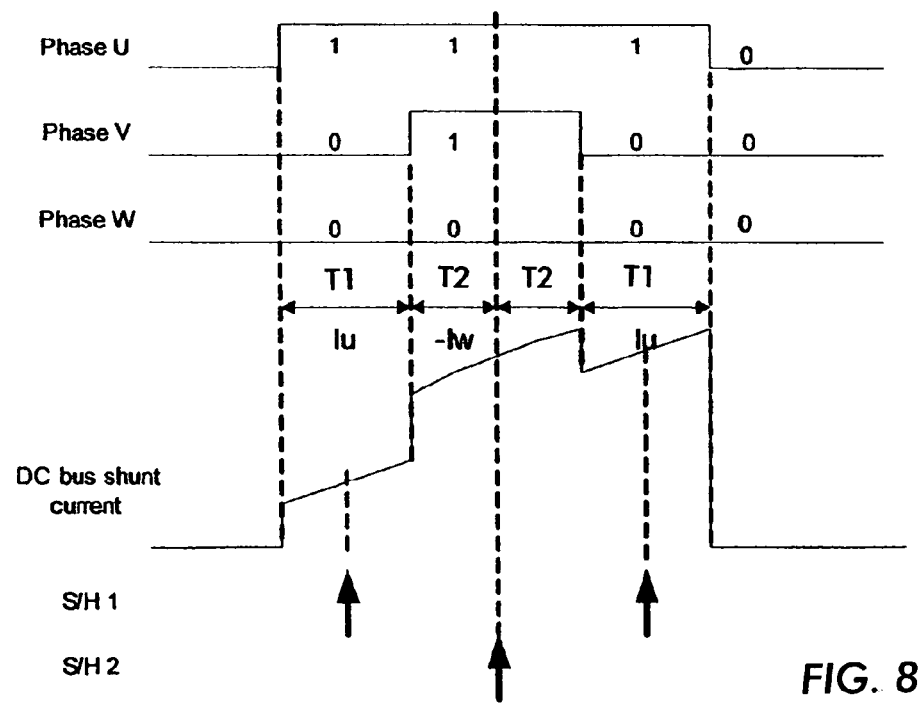
FIG. 8 shows switching patterns and sample times for two phase modulation.
Figure 9:
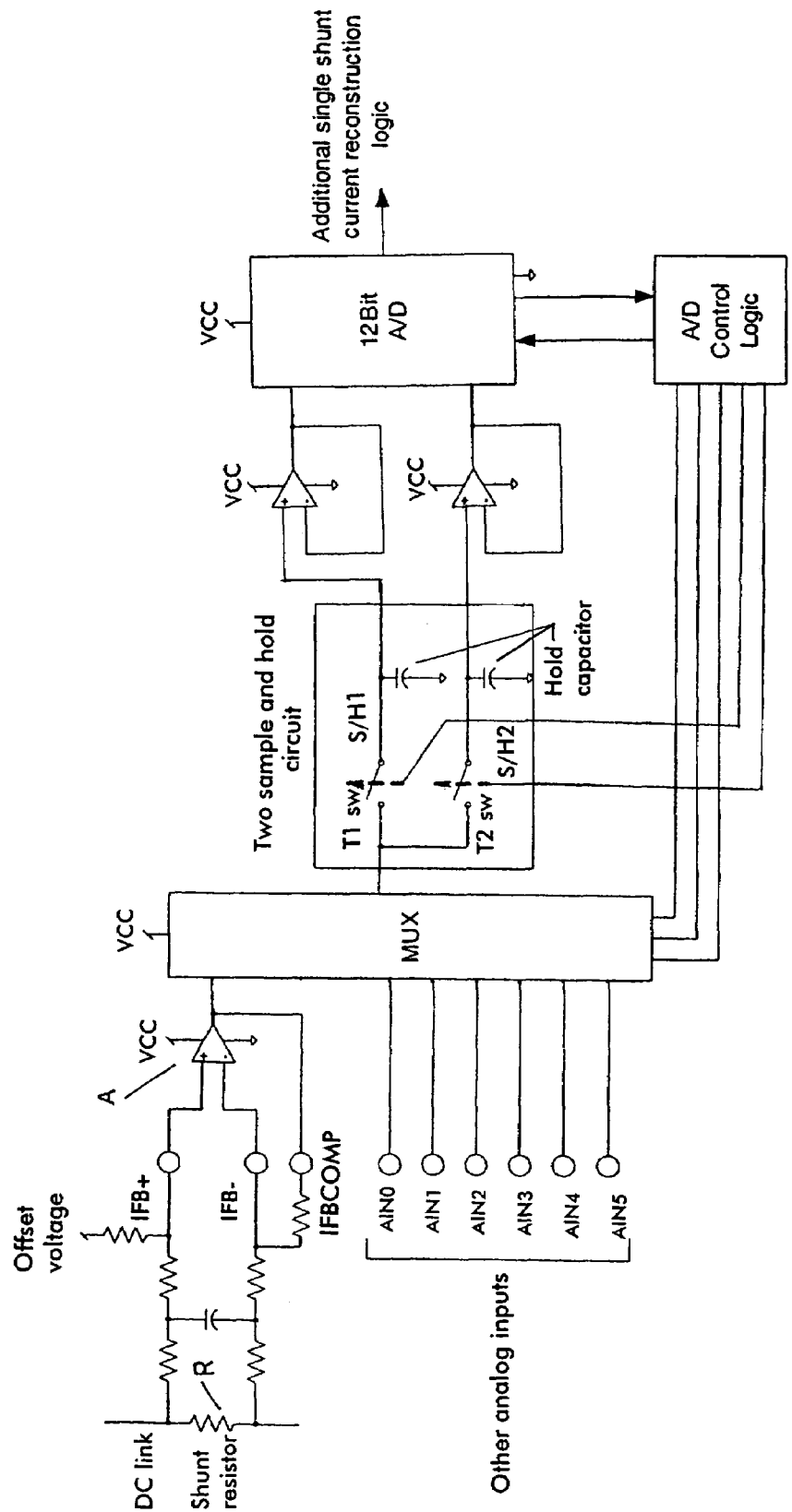
FIG. 9 shows another embodiment of the circuit of the inverter.

FIG. 8 shows a typical switching pattern in 2-phase PWM modulation with two separate sample and hold circuits. In this 2-phase PWM, the phase W switches always have the same state, i.e., the upper switch $W_1$ is off and $W_2$ is always on. When the T1 period becomes small, in the same way, two actions occur, A/D conversion of T1 period and capturing T2 period motor current by the sampling and hold circuit (S/H2).

Therefore, the new circuit will operate on both the 3-phase and 2-phase PWM modulation schemes.

Although the present invention has been described in relation to particular embodiments thereof, many other variations and modifications and other uses will become apparent to those skilled in the art. Therefore the present invention should be limited not by the specific disclosure herein, but only by the appended claims.

What is claimed is:

1. Apparatus for reconstructing the phase currents of a multiphase load driven by a multiphase inverter fed by a DC link and controlled by a PWM controller, the apparatus comprising:

a sensor in the DC link;

first and second sampling arrangements for sampling the current in the DC link by obtaining an output from said sensor, the first sampling arrangement obtaining a first sample of the current in the DC link during a first time period corresponding to a first switching pattern of said multiphase inverter and storing said first sample;

the second sampling arrangement obtaining a second sample of the current in the DC link during a second time period after said first time period and corresponding to a second switching pattern of said multiphase inverter and storing said second sample;

an A/D converter for converting said first sample to a digital signal during a time period after said first time period and for converting said second sample to a digital signal during a following third time period.

2. The apparatus of claim 1, wherein the first and second sampling arrangement comprises sample and hold circuits.

3. The apparatus of claim 1, wherein the sampling arrangements operate such that during a time period, the sampling arrangement samples the current in the DC link for that time period and the A/D converter converts the sample to a digital value for a previous time period.

4. The apparatus of claim 1, wherein the inverter is three-phase modulated.

5. The apparatus of claim 4, wherein the sampling arrangements sample sequentially such that the first sampling arrangement samples, then the second sampling arrangement samples twice followed by the first sampling arrangement in a PWM period.

6. The apparatus of claim 1, wherein the inverter is two-phase modulated.

7. The apparatus of claim 6, wherein the sampling arrangements sample sequentially such that the first sampling arrangement samples, then the second sampling arrangement samples followed again by the first sampling arrangement in a PWM period.

8. The apparatus of claim 1, further comprising a multiplexer circuit disposed between said first and second sampling arrangements and said A/D converter.

9. The apparatus of claim 1, further comprising a multiplexer circuit coupled to said sensor, said first and second sampling arrangements being provided with an output from said multiplexer and providing outputs to said A/D converter.

10. The apparatus of claim 1, wherein the sensor comprises a resistor in the DC link.

11. The apparatus of claim 1, wherein the sensor comprises a Hall effect sensor.

12. The apparatus of claim 1, wherein the A/D converter converts the first sample to a digital signal during the second time period.

13. The apparatus of claim 1, wherein the A/D converter converts the second sample to a digital signal during the third time period.

14. The apparatus of claim 2, wherein the sample and hold circuits each comprise a switch and a storage capacitor.

* * * * *